(12) United States Patent
Fisher et al.

(10) Patent No.: US 10,310,938 B2
(45) Date of Patent: *Jun. 4, 2019

(54) DATA DEDUPLICATION WITH REDUCED HASH COMPUTATIONS

(71) Applicant: INTERNATIONAL BUSINESS MACHINES CORPORATION, Armonk, NY (US)

(72) Inventors: Timothy J. Fisher, Cypress, TX (US); Nikolas Ioannou, Zurich (CH); Thomas Parnell, Zurich (CH); Roman A. Pletka, Zurich (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/823,891

(22) Filed: Nov. 28, 2017

(65) Prior Publication Data

US 2018/0081752 A1 Mar. 22, 2018

Related U.S. Application Data

(63) Continuation of application No. 15/438,287, filed on Feb. 21, 2017, which is a continuation of application
(Continued)

(51) Int. Cl.
*G06F 12/00* (2006.01)
*G06F 11/10* (2006.01)
(Continued)

(52) U.S. Cl.
CPC ........ *G06F 11/1004* (2013.01); *G06F 3/0608* (2013.01); *G06F 3/0641* (2013.01);
(Continued)

(58) Field of Classification Search
None
See application file for complete search history.

(56) References Cited

U.S. PATENT DOCUMENTS

| 7,925,683 B2 | 4/2011 | Jain et al. |
| 7,937,371 B2 | 5/2011 | Bates et al. |

(Continued)

FOREIGN PATENT DOCUMENTS

CN 201210452830 3/2013

OTHER PUBLICATIONS

Fisher et al., "Data Deduplication With Reduced Hash Computations", U.S. Appl. No. 15/142,996, filed Apr. 29, 2016; Non-Final Office Action dated Sep. 2, 2016.
(Continued)

*Primary Examiner* — Baboucarr Faal
(74) *Attorney, Agent, or Firm* — Michael R. Long; Jason Sosa

(57) ABSTRACT

Techniques for data deduplication in a data storage system include comparing a first attribute of a received data page to first attributes of one or more stored data pages. In response to the first attribute matching one of the first attributes, a second attribute of the received data page is compared to second attributes of the one or more data pages. In response to the second attribute of the received data page matching one of the second attributes, a fingerprint of the received data page is compared to fingerprints of the one or more data pages. In response to the fingerprint of the received data page matching one of the fingerprints, the received data page is discarded and replaced with a reference to the corresponding data page already stored in the storage system. In response to first attribute, the second attribute, or the fingerprint of the received data page not matching, the received data page is stored.

14 Claims, 10 Drawing Sheets

Related U.S. Application Data

No. 15/142,996, filed on Apr. 29, 2016, now Pat. No. 9,575,681.

(51) Int. Cl.
*G06F 3/06* (2006.01)
*G06F 16/215* (2019.01)

(52) U.S. Cl.
CPC .......... *G06F 3/0644* (2013.01); *G06F 3/0661* (2013.01); *G06F 3/0688* (2013.01); *G06F 16/215* (2019.01)

(56) References Cited

U.S. PATENT DOCUMENTS

| | | | |
|---|---|---|---|
| 8,458,144 B2 | 7/2013 | Maydew et al. | |
| 8,706,971 B1 | 4/2014 | Nayak | |
| 9,063,664 B1 | 6/2015 | Li et al. | |
| 9,575,681 B1 | 2/2017 | Fisher et al. | |
| 2011/0055471 A1 | 3/2011 | Thatcher et al. | |
| 2011/0125771 A1 | 5/2011 | Gladwin et al. | |
| 2013/0191350 A1 | 7/2013 | Esaka et al. | |
| 2014/0188819 A1 | 7/2014 | Bagal | |
| 2015/0178307 A1 | 7/2015 | Bates et al. | |

OTHER PUBLICATIONS

Fisher et al., "Data Deduplication With Reduced Hash Computations", U.S. Appl. No. 15/142,996, filed Apr. 29, 2016; Notice of Allowance dated Jan. 9, 2017.

Fisher et al., "Data Deduplication With Reduced Hash Computations", U.S. Appl. No. 15/438,287, filed Feb. 21, 2017; Non-Final Office Action dated Apr. 7, 2017.

Fisher et al., "Data Deduplication With Reduced Hash Computations", U.S. Appl. No. 15/438,287, filed Feb. 21, 2017; Notice of Allowance dated Aug. 21, 2017.

International Application No. PCT/IB2017/052365, International Filing Date: Apr. 25, 2017, International Search Report and Written Opinion (ISR/WO) dated Jul. 4, 2017.

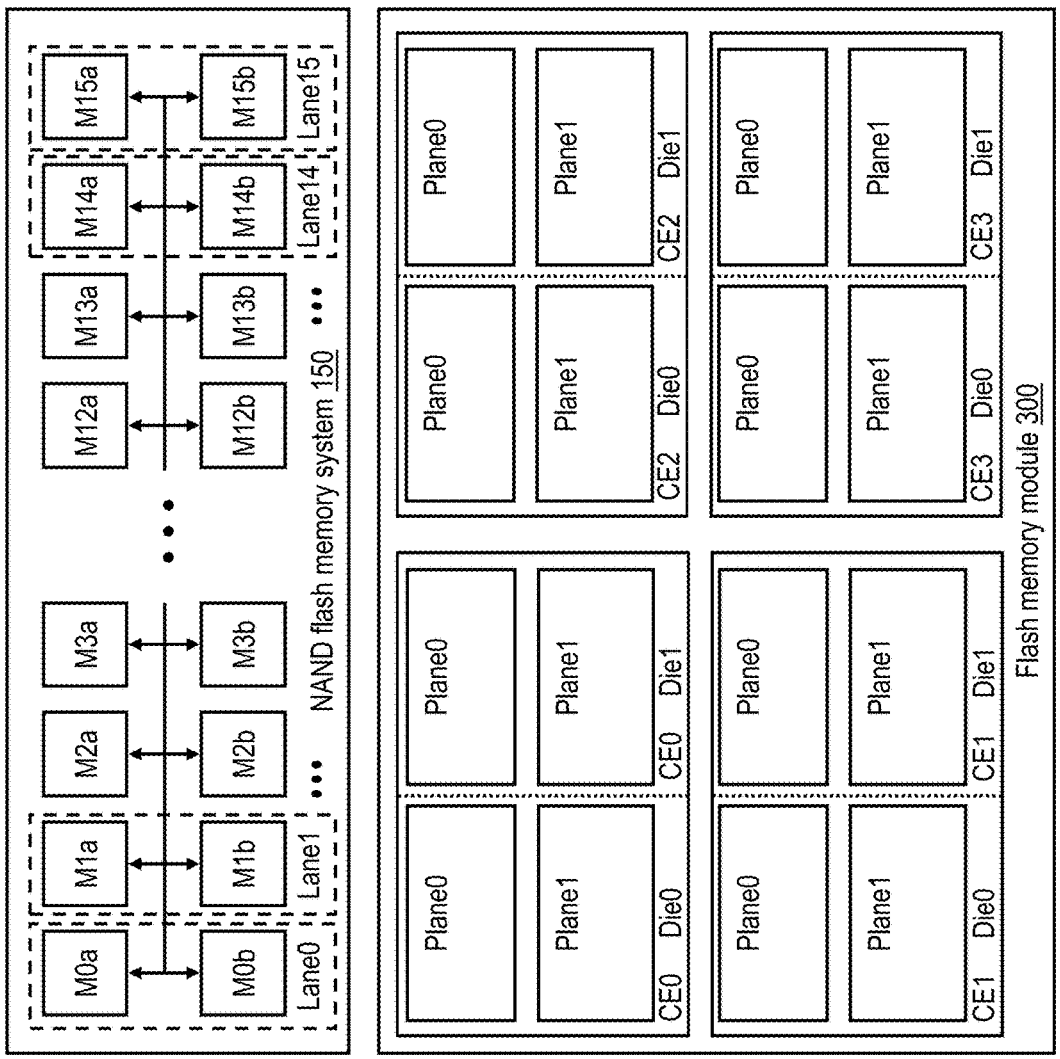

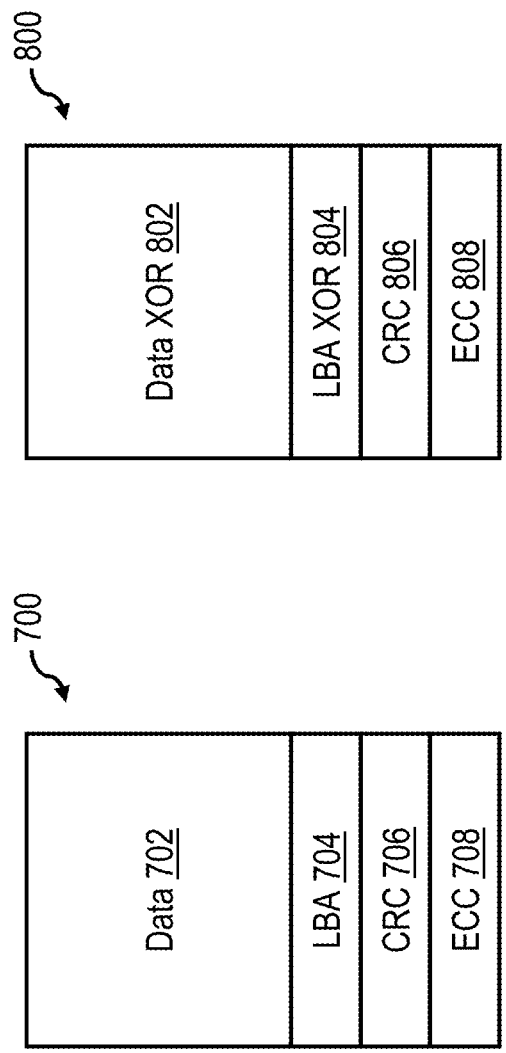

DATA DEDUPLICATION WITH REDUCED HASH COMPUTATIONS

BACKGROUND OF THE INVENTION

This disclosure relates to data processing and storage, and more specifically, to management of a data storage system, such as a flash memory system, to avoid unnecessary hash computations during data deduplication.

NAND flash memory is an electrically programmable and erasable non-volatile memory technology that stores one or more bits of data per memory cell as a charge on the floating gate of a transistor or a similar charge trap structure. In a typical implementation, a NAND flash memory array is organized in blocks (also referred to as "erase blocks") of physical memory, each of which includes multiple physical pages each in turn containing a multiplicity of memory cells. By virtue of the arrangement of the word and bit lines utilized to access memory cells, flash memory arrays can generally be programmed on a page basis, but are erased on a block basis.

As is known in the art, blocks of NAND flash memory must be erased prior to being programmed with new data. A block of NAND flash memory cells is erased by applying a high positive erase voltage pulse to the p-well bulk area of the selected block and by biasing to ground all of the word lines of the memory cells to be erased. Application of the erase pulse promotes tunneling of electrons off of the floating gates of the memory cells biased to ground to give them a net positive charge and thus transition the voltage thresholds of the memory cells toward the erased state. Each erase pulse is generally followed by an erase verify operation that reads the erase block to determine whether the erase operation was successful, for example, by verifying that less than a threshold number of memory cells in the erase block have been unsuccessfully erased. In general, erase pulses continue to be applied to the erase block until the erase verify operation succeeds or until a predetermined number of erase pulses have been used (i.e., the erase pulse budget is exhausted).

A NAND flash memory cell can be programmed by applying a positive high program voltage to the word line of the memory cell to be programmed and by applying an intermediate pass voltage to the memory cells in the same string in which programming is to be inhibited. Application of the program voltage causes tunneling of electrons onto the floating gate to change its state from an initial erased state to a programmed state having a net negative charge. Following programming, the programmed page is typically read in a read verify operation to ensure that the program operation was successful, for example, by verifying that less than a threshold number of memory cells in the programmed page contain bit errors. In general, program and read verify operations are applied to the page until the read verify operation succeeds or until a predetermined number of programming pulses have been used (i.e., the program pulse budget is exhausted).

A Cyclic Redundancy Check (CRC) is an error detecting code commonly used in storage devices to detect accidental changes in data. In implementation, a data set to be stored has a calculated CRC value attached that is based on a remainder of a polynomial division of a content of the data set. On retrieval of the data set from a storage device, calculation of a CRC value is repeated and corrective action can then be taken against presumed data corruption if CRC values do not match.

In computing, data deduplication is a technique for eliminating duplicate copies of data. Data deduplication is used to improve storage utilization and can also be applied to network data transfers to reduce a number of bytes transmitted. In the deduplication process, unique chunks of data (e.g., data pages) are identified and stored during a process of analysis. As the analysis continues, other chunks of data are compared to stored chunks of data and when a match occurs the redundant chunk of data is replaced with a reference that points to the stored chunk of data. Given that a same byte pattern may occur dozens, hundreds, or even thousands of times (e.g. a match frequency may be dependent on a chunk size), the amount of data that must be stored or transferred can be greatly reduced. For example a typical email system may contain one-hundred (100) instances of the same one (1) MB file attachment. Each time the email system is backed up, all one-hundred (100) instances of the attachment may be stored, requiring one-hundred (100) MB of storage space. When data deduplication is implemented, only one instance of the attachment is actually stored and subsequent instances are referenced to the stored instance. In general, storage-based data deduplication reduces the amount of storage needed for a given data set.

In-line data deduplication has conventionally performed deduplication in real-time hash computations as data enters a storage system. When a storage system receives new data, the storage system determines if the new data corresponds to existing data that is already stored and, if so, the storage system references the existing data and does not store the new data. With background data deduplication, new data is first stored on the storage system and then a background process is initiated at a later point-in-time to search for duplicate data. A benefit of background data deduplication is that there is no need to wait for hash computation and lookup to be completed before storing incoming data, thereby ensuring that storage system performance is not degraded. A drawback of background data deduplication is that duplicate data is stored, which may be an issue if a storage system is near full capacity. A benefit of in-line data deduplication over background data deduplication is that in-line data deduplication requires less storage, as data is not duplicated in the storage system. However, given that hash computations and lookups may take a relatively long time period to perform, data ingestion for in-line data deduplication can be slower than background data deduplication, thereby reducing write throughput of a storage system. Storage systems supporting deduplication typically implement one of these two techniques or a combination thereof.

Conventional storage systems have usually performed unnecessary hash computations during data deduplication, unnecessarily degrading their performance.

BRIEF SUMMARY

A technique of data deduplication for a data storage system includes comparing, by the storage system, a first attribute of a received data page to one or more corresponding first attributes of one or more data pages stored in a storage system. In response to the first attribute of the received data page not being the same as one or more of the first attributes, the storage system stores the received data page in the storage system. In response to the first attribute of the received data page being the same as one or more of the first attributes, the storage system compares a fingerprint of the received data page to one or more fingerprints of the one or more data pages stored in the storage system. In response to the fingerprint of the received data page not being the same as one or more of the fingerprints, the storage system stores the received data page in the storage system. In response to the fingerprint of the received data page being the same as one or more of the fingerprints, the storage system replaces the received data page with a reference to a corresponding data page included in the one or more data pages stored in the storage system and discards the received data page. The first attribute corresponds to one of a compressed page size and a cyclic redundancy check (CRC) value.

According to another aspect, in response to the first attribute being the same as one or more of the first attributes, the storage system compares a second attribute of the received data page to one or more corresponding second attributes of the one or more data pages stored in the storage system prior to the comparing, by the storage system, a fingerprint of the received data page. In response to the second attribute of the received data page not being the same as one or more of the second attributes, the storage system stores the received data page in the storage system. In response to the second attribute of the received data page being the same as one or more of the second attributes, the storage system compares the fingerprint of the received data page to one or more fingerprints of the one or more data pages stored in the storage system. The second attribute corresponds to a remaining one of the compressed page size and the CRC value.

According to another aspect, the first attribute corresponds to the compressed page size, the second attribute corresponds to the CRC value, and the technique further comprises compressing the received data page to generate the compressed page size. In response to the compressed page size of the received data page being the same as a compressed page size of one of the data pages stored in the storage system, the CRC value for the received data page is generated.

According to yet another aspect, the first attribute corresponds to the CRC value, the second attribute corresponds to the compressed page size, and the technique further comprises generating the CRC value for the received data page. In response to the CRC value of the received data page being the same as a CRC value of one of the data pages stored in the storage system, the received data page is compressed to generate the compressed page size.

According to another aspect, the technique includes generating the fingerprint for the received data page.

According to still another aspect, the technique further includes requesting, by an interface node of the storage system, scanning on a flash card of the storage system for one or more compressed page sizes stored in a table that associates compressed page sizes with logical addresses of stored data pages. The interface node receives a result of the scanning from the flash card.

According to yet another aspect, the technique further includes requesting, by an interface node of the storage system, scanning on a flash card of the storage system for one or more CRC values. The interface node receives a result of the scanning from the flash card. The CRC values are stored in a NAND flash memory system of the flash card.

According to another aspect, the technique further includes adjusting the CRC values to remove information not related to a logical data page.

According to still another aspect, the received data page is read from a flash card by a background deduplication process.

The disclosed techniques may be implemented as a method, a data storage system, and/or a program product (including program code stored in a storage device).

BRIEF DESCRIPTION OF THE SEVERAL VIEWS OF THE DRAWINGS

FIGS. 2-5 illustrate an exemplary arrangement of physical memory within a NAND flash memory system in accordance with the present disclosure;

FIG. 7 illustrates an exemplary codeword stored in each data page in accordance with the present disclosure;

FIG. 8 depicts an exemplary codeword stored in each data protection page in accordance with the present disclosure;

DETAILED DESCRIPTION

Figure 1A:
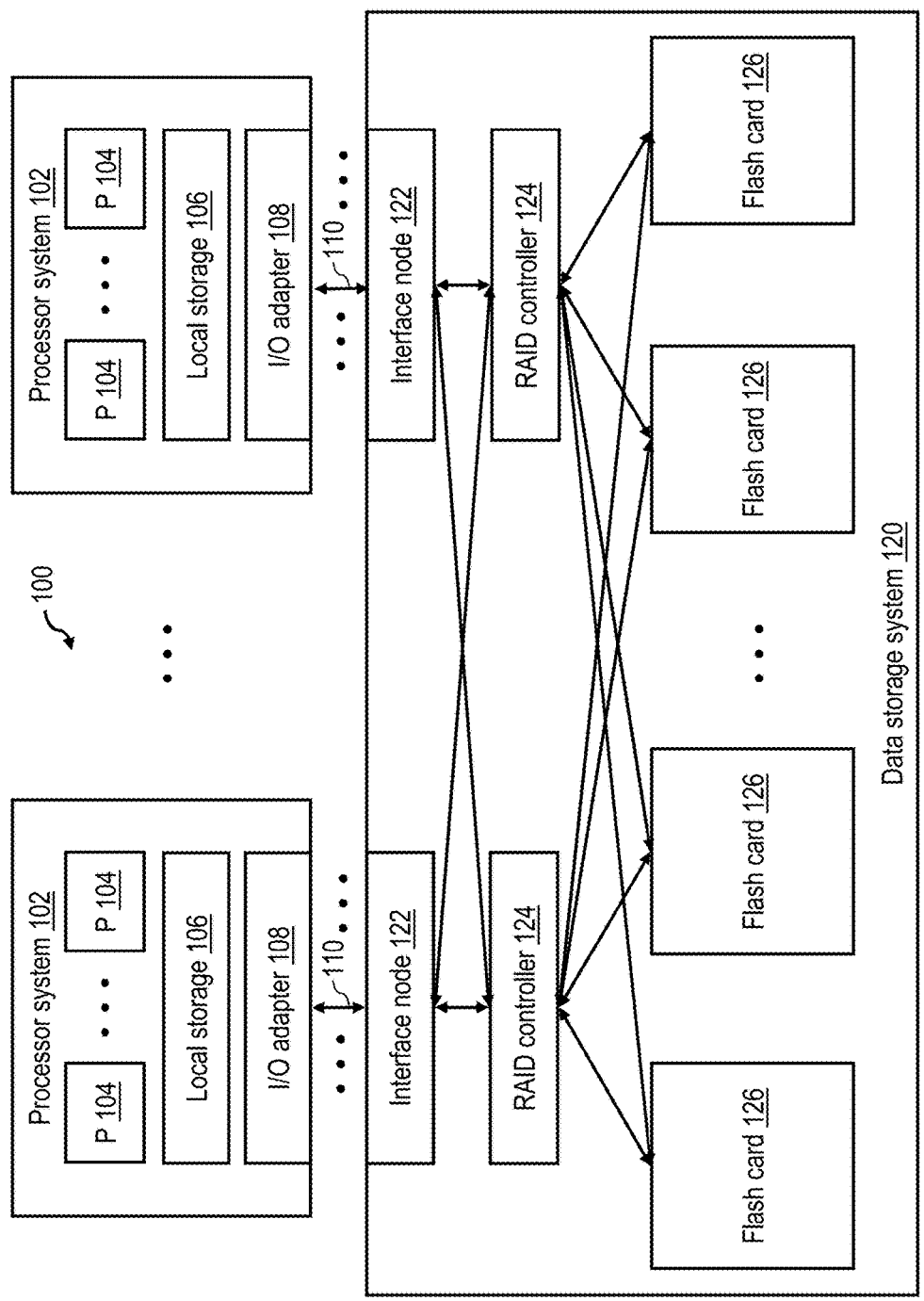
FIG. 1A is a high level block diagram of a data processing environment in accordance with one embodiment.

As mentioned above, data deduplication may be implemented in-line and/or as a background functionality that searches for duplicate data in an existing data set stored in a storage system. Conventionally, in order to detect a duplicate data page, respective fingerprints of data pages have been computed and then compared. Typically, a dictionary of fingerprints for stored data pages has been maintained to facilitate detection of duplicate data pages prior to a write operation. Due to computational overhead and memory constraints, data deduplication may be performed in a best-effort way, which may result in not all data being deduplicated in-line. In this case, a search for duplicate data pages has conventionally been initiated in the background when a load on a storage system is relatively low.

According to one or more embodiments of the present disclosure, additional information (e.g., available in a flash card) may be utilized in order to avoid unnecessary hash computations that have been used for data deduplication. The additional information that used to preclude unnecessary hash computations may, for example, include: Cyclic Redundancy Check (CRC) values for stored data pages; and sizes of the stored data pages. It should be appreciated that a CRC for a received data page can usually be computed (calculated) much faster than a strong hash function. It should be noted that CRC values for stored data pages typically also protect data header information of the stored data pages and, in this case, the data header information needs to be extracted from a CRC value of a stored data page prior to comparing the CRC value for the stored page with a CRC value for a received data page (that may not yet be stored in the storage system). In one or more embodiments, a physical data page header is configured to store a CRC value for each codeword stored in a physical data page. Similarly, as one or more data pages may be stored in one codeword or a single data page may overlap a codeword, data not belonging to the data page for which the CRC should be compared has to be extracted from the one or more CRC values of the stored codewords in the same way as the data header information above. A CRC value extracted by this method is called a CRC value of stored data page. When data compression is employed, compressed page sizes of stored data pages may be even more readily accessed when the compressed page sizes are stored in a logical-to-physical translation (LPT) table, as contrasted with accessing NAND flash memory to retrieve CRC values for the stored data pages.

According to one or more embodiments of the present disclosure, compressed page sizes and CRC values of received data pages are compared (to compressed page sizes and CRC values of stored data pages) prior to performing relatively expensive (in terms of time and processing) fingerprint computations and comparisons. Fingerprints are typically obtained using a fingerprint generation algorithm, which maps a data page to significantly shorter byte string such that the fingerprint uniquely identifies the original data page with a sufficiently high probability. For example a cryptographic hash function can be used as a fingerprint generation algorithm but other functions could be used as well. In contrast to fingerprints, attributes such as the CRC value or compressed page size also represent a significantly shorter byte string of the data page, but they do not uniquely identify a data page with a sufficiently high probability.

In one embodiment, a compressed page size for a received data page is initially compared to respective compressed page sizes for stored data pages (or at least some of the stored data pages). If the compressed page size of the received data page matches a compressed page size of one or more of the stored data pages, a CRC value for the received data page is then computed (generated) and compared to CRC values of the stored data pages (or at least some of the stored data pages). If the CRC value of the received data page matches a CRC value of one or more of the stored data pages, a fingerprint of the received data page is then computed (generated) and compared to fingerprints of the stored data pages (or at least some of the stored data pages) to determine whether the received data page is a duplicate data page. CRC values and compressed page sizes can also be used when the received data page is a data page being processed by background data deduplication. Background data deduplication is typically performed when a storage system detected potential misses of deduplication opportunities (e.g., due to lack of inline deduplication, high load, or incomplete fingerprint lookup table) and when a load on a data storage system is relatively low. When CRC values and compressed page sizes of all stored data pages are not readily available, background data deduplication may be implemented using only the fingerprint information.

In another embodiment, a CRC value of a received data page is initially compared to respective CRC values of stored data pages (or at least some of the stored data pages). If the CRC value of the received data page matches a CRC value of one or more of the stored data pages, a compressed page size for the received data page is then computed (generated) and compared to compressed page sizes of the stored data pages (or at least some of the stored data pages). If the compressed page size of the received data page matches a compressed page size of one or more of the stored data pages, a fingerprint of the received data page is then computed and compared to fingerprints of the stored data pages (or at least some of the stored data pages) to determine whether the received data page is a duplicate data page.

With reference to the figures and with particular reference to FIG. 1A, there is illustrated a high level block diagram of an exemplary data processing environment 100 including a data storage system 120 that is configured to perform data deduplication according to the present disclosure and having a non-volatile memory array as described further herein. As shown, data processing environment 100 includes one or more hosts, such as a processor system 102 having one or more processors 104 that process instructions and data. Processor system 102 may additionally include local storage 106 (e.g., Dynamic Random Access Memory (DRAM) or disks) that may store program code, operands and/or execution results of the processing performed by processor(s) 104. In various embodiments, processor system 102 can be, for example, a mobile computing device (such as a smartphone or tablet), a laptop or desktop personal computer system, a server computer system (such as one of the POWER® series available from International Business Machines Corporation), or a mainframe computer system. Processor system 102 can also be an embedded processor system using various processors such as ARM®, POWER, Intel X86, or any other processor combined with memory caches, memory controllers, local storage, I/O bus hubs, etc.

Each processor system 102 further includes an input/output (I/O) adapter 108 that is coupled directly (i.e., without any intervening device) or indirectly (i.e., through at least one intermediate device) to a data storage system 120 via an I/O channel 110. In various embodiments, an I/O channel 110 may employ any one or a combination of known or future developed communication protocols, including, for example, Fibre Channel (FC), FC over Ethernet (FCoE), Internet Small Computer System Interface (iSCSI), Infini-Band, Transport Control Protocol/Internet Protocol (TCP/IP), Peripheral Component Interconnect Express (PCIe), etc. I/O operations (IOPs) communicated via I/O channel 110 include read IOPs by which a processor system 102 requests data from data storage system 120 and write IOPs by which a processor system 102 requests storage of data in data storage system 120.

In the illustrated embodiment, data storage system 120 includes multiple interface nodes 122 through which data storage system 120 receives and responds to IOPs via I/O channels 110. Each interface node 122 is coupled to each of multiple Redundant Array of Inexpensive Disks (RAID) controllers 124 in order to facilitate fault tolerance and load balancing. Each of RAID controllers 124 is in turn coupled (e.g., by a PCIe bus) to each of multiple flash cards 126 including, in this example, NAND flash storage media. In other embodiments, other lossy storage media can be employed.

Figure 1B:
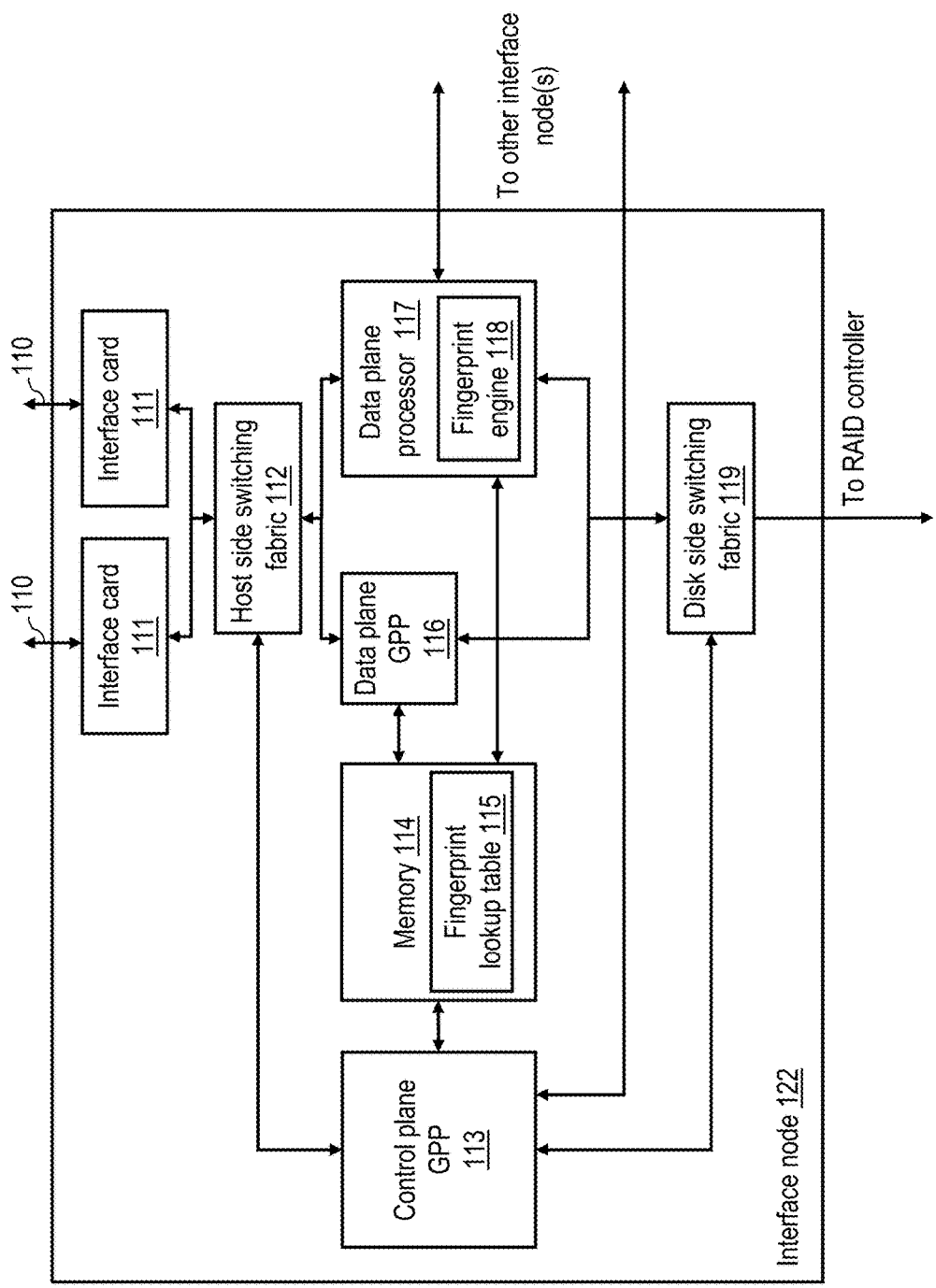
FIG. 1B is a more detailed block diagram of an exemplary interface node of the data storage system of FIG. 1A.

FIG. 1B depicts a more detailed block diagram of an interface node 122 of data storage system 120 of FIG. 1A. Interface node 122 includes one or more interface cards 111 that serve as an interface to processor systems 102 through I/O channels 110 and connect to host side switching fabric 112. The host side switching fabric 112 acts as a switch and handles all data transfers between interface cards 111 and processing units in interface node 122, namely control plane general purpose processor (GPP) 113, data plane GPP 116, and data plane processor 117. Typically, host side switching fabric 112 consist of a PCIe switch, but other switch technologies may be used as well. Data plane processor 117 is a special purpose processor that can be implemented, for example, by an Application Specific Integrated Circuit (ASIC) or a Field Programmable Gate Array (FPGA)). Control plane GPP 113, data plane GPP 116, and data plane processor 117 are all connected to memory 114 which may be implemented as a shared memory between these components, separate memories, or a combination thereof.

Data plane processor 117 implements a fingerprint engine 118 that generates fingerprints for received data pages that are to be written to or read from flash cards 126. Data plane processor 117 may further access a fingerprint lookup table (LUT) 115 stored in memory 114 either directly or by communicating with data plane GPP 116 or control plane GPP 113. Fingerprints for received data pages may include hashes, CRCs, or a combination of hashes and CRCs. Fingerprint engine 118 (or other logic in data plane processor 117) may also be configured to determine compressed page sizes of received data pages. Fingerprint LUT 115 stores fingerprints for data pages that are stored in flash cards 126. It should be appreciated that fingerprint LUT 115 may, at any given time, only store fingerprints for some of the data pages stored in flash cards 126 due to memory size limitations.

In embodiments in which data plane processor 117 is implemented with an FPGA, control plane GPP 113 may program and configure data plane processor 117 during start-up of data storage system 120. Data plane GPP 116 and control plane GPP 113 control data plane processor 117 as well as access to flash cards 126 either indirectly through the control of data plane processor 117 or directly through disk side switching fabric 119. Control plane GPP 113 executes system management functions as well as higher level services such as snapshots, thin provisioning, and deduplication. Data plane GPP 116 executes protocol specific functions. Control plane GPP 113, data plane GPP 116, and data plane processor 117 are connected to RAID controller 124 through disk side switching fabric 119 which typically consist of a PCIe switch, but other switch technologies may be used as well. FIG. 1B further illustrates control plane GPP 113 and data plane processor 117 being connected to other interface nodes 122 in data storage system 120 to handle fail-over scenarios or for performing other data synchronization functions.

Figure 1C:
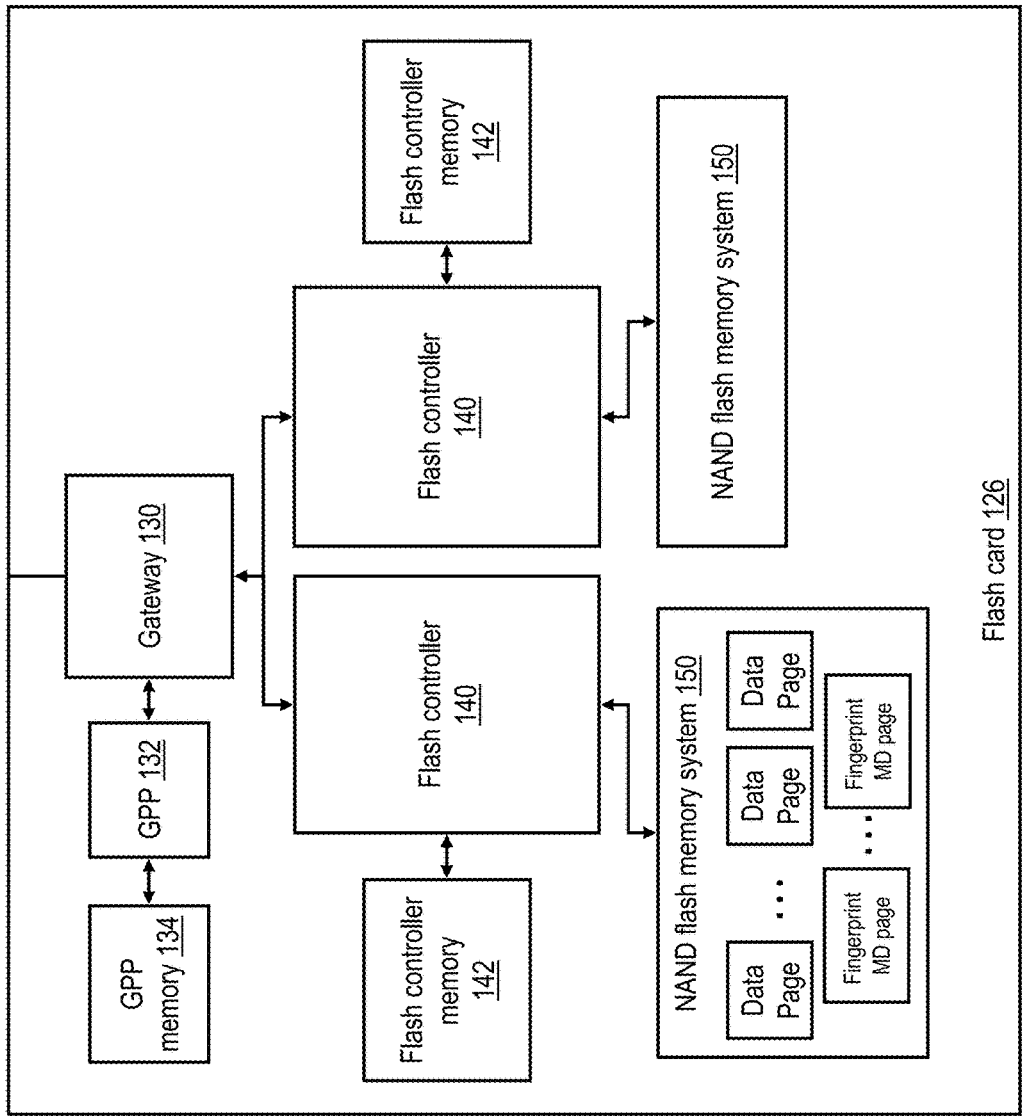
FIG. 1C is a more detailed block diagram of an exemplary flash card of the data storage system of FIG. 1A.

FIG. 1C depicts a more detailed block diagram of a flash card 126 of data storage system 120 of FIG. 1A. Flash card 126 includes a gateway 130 that serves as an interface between flash card 126 and RAID controllers 124. Gateway 130 is coupled to a general-purpose processor (GPP) 132, which can be configured (e.g., by program code) to perform various management functions, such as pre-processing of IOPs received by gateway 130 and/or to schedule servicing of the IOPs by flash card 126. GPP 132 is coupled to a GPP memory 134 (e.g., Dynamic Random Access Memory (DRAM) or Magneto-resistive Random Access Memory (MRAM)) that can conveniently buffer data created, referenced and/or modified by GPP 132 in the course of its processing.

Gateway 130 is further coupled to multiple flash controllers 140, each of which controls a respective NAND flash memory system 150. Flash controllers 140 can be implemented, for example, by an Application Specific Integrated Circuit (ASIC) or a Field Programmable Gate Array (FPGA)) having an associated flash controller memory 142 (e.g., DRAM). In embodiments in which flash controllers 140 are implemented with an FPGA, GPP 132 may program and configure flash controllers 140 during start-up of data storage system 120. After startup, in general operation flash controllers 140 receive read and write IOPs from gateway 130 that request to read data stored in NAND flash memory system 150 and/or to store data in NAND flash memory system 150. Flash controllers 140 service these IOPs, for example, by accessing NAND flash memory systems 150 to read or write the requested data from or into NAND flash memory systems 150 or by accessing one or more read and/or write caches (not illustrated in FIG. 1C) associated with NAND flash memory systems 150. For example, NAND flash memory systems 150 may store a combination of data pages and one or more fingerprint metadata (MD) pages that provide fingerprint metadata for one or more data pages. In an alternative embodiment, fingerprint MD may be stored in a different memory than data pages.

Flash controllers 140 implement a Flash Translation Layer (FTL) that provides logical-to-physical address translation to enable access to specific memory locations within NAND flash memory systems 150. In general, an IOP received by flash controller 140 from a host device, such as a processor system 102, contains the logical block address (LBA) at which the data is to be accessed (read or written) and, if a write IOP, the write data to be written to data storage system 120. The IOP may also specify the amount (or size) of the data to be accessed. Other information may also be communicated depending on the protocol and features supported by data storage system 120. As is known to those skilled in the art, NAND flash memory, such as that employed in NAND flash memory systems 150, is constrained by its construction such that the smallest granule of data that can be accessed by a read or write IOP is fixed at the size of a single flash memory page, for example, 16 kilobytes (kB). The LBA provided by the host device corresponds to a logical page within a logical address space, the logical page typically having a size of four (4) kilobytes. As such, more than one logical page may be stored in a physical flash page. The FTL translates this LBA into a physical address assigned to a corresponding physical location in a NAND flash memory system 150.

Flash controllers 140 may perform address translation and/or store mappings between logical and physical addresses in a logical-to-physical translation data structure, such as a logical-to-physical translation (LPT) table, which may conveniently be stored in flash controller memory 142. An LPT table may also be configured to store compressed page sizes of data pages stored in NAND flash memory system 150 and even further their CRC values. According to aspects of the present disclosure, the compressed page sizes of stored data pages may be utilized in a determination of whether a received data page has a same size as a stored data page in the deduplication techniques disclosed herein and is, thus, a candidate duplicate data page.

NAND flash memory systems 150 may take many forms in various embodiments. Referring now to FIGS. 2-5, there is depicted one exemplary arrangement of physical memory within a NAND flash memory system 150 in accordance with one exemplary embodiment.

As shown in FIG. 2, NAND flash memory system 150 may be formed from thirty-two (32) individually addressable NAND flash memory storage devices. In the illustrated example, each of the flash memory storage devices M0a-M15b takes the form of a board-mounted flash memory module capable of storing two or more bits per cell. Thus, flash memory modules may be implemented with Single Level Cell (SLC), Multi-Level Cell (MLC), Three Level Cell (TLC), or Quad Level Cell (QLC) memory. The thirty-two NAND flash memory modules are arranged in sixteen groups of two, (M0a, M0b) through (M15a, M15b). For purposes of the physical addressing scheme, each group of two modules forms a "lane," also sometimes referred to as a "channel," such that NAND flash memory system 150 includes sixteen channels or lanes (Lane0-Lane15).

In a preferred embodiment, each of the individual lanes has a respective associated bus coupling it to the associated flash controller 140. Thus, by directing its communications to one of the specific communication buses, flash controller 140 can direct its communications to one of the lanes of memory modules. Because each communication bus for a given lane is independent of the communication buses for the other lanes, a flash controller 140 can issue commands and send or receive data across the various communication buses at the same time, enabling the flash controller 140 to access the flash memory modules corresponding to the individual lanes at, or very nearly at, the same time.

With reference now to FIG. 3, there is illustrated an exemplary embodiment of a flash memory module 300 that can be utilized to implement any of flash memory modules M0a-M15b of FIG. 2. As shown in FIG. 3, the physical storage locations provided by flash memory module 300 are further subdivided into physical locations that can be addressed and/or identified through Chip Enables (CEs). In the example of FIG. 3, the physical memory of each flash memory chip 300 is divided into four Chip Enables (CE0, CE1, CE2 and CE3), each having a respective CE line that is asserted by flash controller 140 to enable access to or from the physical memory locations within the corresponding CE. Each CE is in turn subdivided into multiple dice (e.g., Die0 and Die1) each having two planes (e.g., Plane0 and Plane1). Each plane represents a collection of blocks (described below) that, because of the physical layout of the flash memory chips, are physically associated with one another and that utilize common circuitry (e.g., I/O buffers) for the performance of various operations, such as read and write operations.

Figure 4:
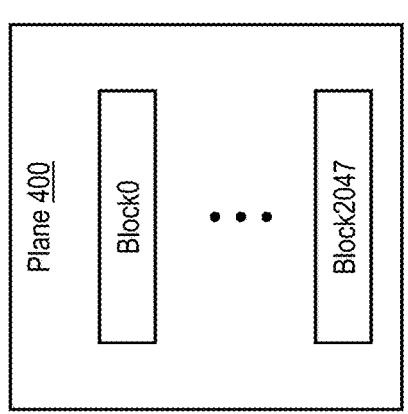
Figure 5:
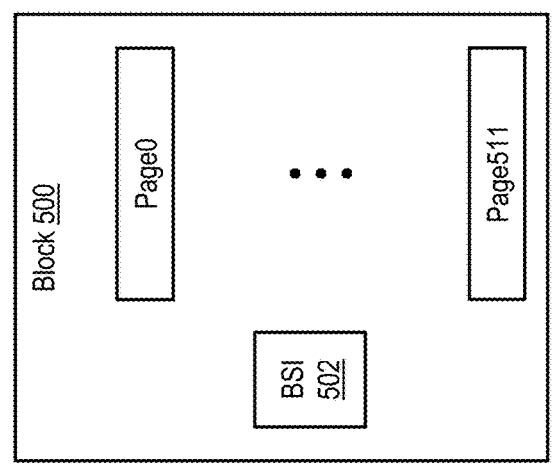

As further shown in FIGS. 4-5, an exemplary plane 400, which can be utilized to implement any of the planes within flash memory module 300 of FIG. 3, includes, for example, 1024 or 2048 blocks of physical memory. Note that manufacturers often add some additional blocks as some blocks might fail early. In general, a block is a collection of physical pages that are associated with one another, typically in a physical manner. This association is such that a block is defined to be the smallest granularity of physical storage locations that can be erased within NAND flash memory system 150. In the embodiment of FIG. 5, each block 500 includes, for example, 256 or 512 physical pages, where a physical page is defined to be the smallest individually addressable data unit for read and write access. In the exemplary system, each physical page of data has a common capacity (e.g., 16 kB) for data storage plus additional storage for metadata described in more detail below. Thus, data is written into or read from NAND flash memory system 150 on a page-by-page basis, but erased on a block-by-block basis.

If NAND flash memory system 150 is implemented in a memory technology supporting multiple bits per cell, it is common for multiple physical pages of each block 500 to be implemented in the same set of memory cells. For example, assuming 512 physical pages per block 500 as shown in FIG. 5 and two bits per memory cell (i.e., NAND flash memory 150 is implemented in MLC memory), Page0 through Page255 (the lower pages) can be implemented utilizing the first bit of a given set of memory cells and Page256 through Page511 (the upper pages) can be implemented utilizing the second bit of the given set of memory cells. The actual order of lower and upper pages may be interleaved and depends on the manufacturer. In many cases, the endurance of pages within a block 500 vary widely, and in some cases, this variation is particularly pronounced between lower pages (which may generally have a lower endurance) and upper pages (which may generally have a greater endurance).

As further shown in FIG. 5, each block 500 preferably includes block status information (BSI) 502, which indicates the status of each physical page in that block 500 as retired (i.e., no longer used to store user data) or non-retired (i.e., active or still usable to store user data). In various implementations, BSI 502 can be collected into a single data structure (e.g., a vector or table) within block 500, distributed within block 500 (e.g., as one or more bits of metadata appended to each physical page) and/or maintained elsewhere in data storage system 120. As one example, in the embodiment illustrated in FIG. 9 and discussed further below, the page status information of all blocks 500 in a NAND flash memory system 150 is collected in a system-level data structure, for example, a page status table (PST) 946 stored in GPP memory 134 or a flash controller memory 142.

Because the FTL implemented by data storage system 120 isolates the logical address space made available to host devices from the physical memory within NAND flash memory system 150, the size of NAND flash memory system 150 need not be equal to the size of the logical address space presented to host devices. In most embodiments it is beneficial to present a logical address space that is less than the total available physical memory (i.e., to over-provision NAND flash memory system 150). Overprovisioning in this manner ensures that physical memory resources are available when the logical address space is fully utilized, even given the presence of a certain amount of invalid data as described above. In addition to invalid data that has not yet been reclaimed the overprovisioned space can be used to ensure there is enough logical space, even given the presence of memory failures and the memory overhead entailed by the use of data protection schemes, such as Error Correcting Code (ECC), Cyclic Redundancy Check (CRC), and parity.

Figure 6A:
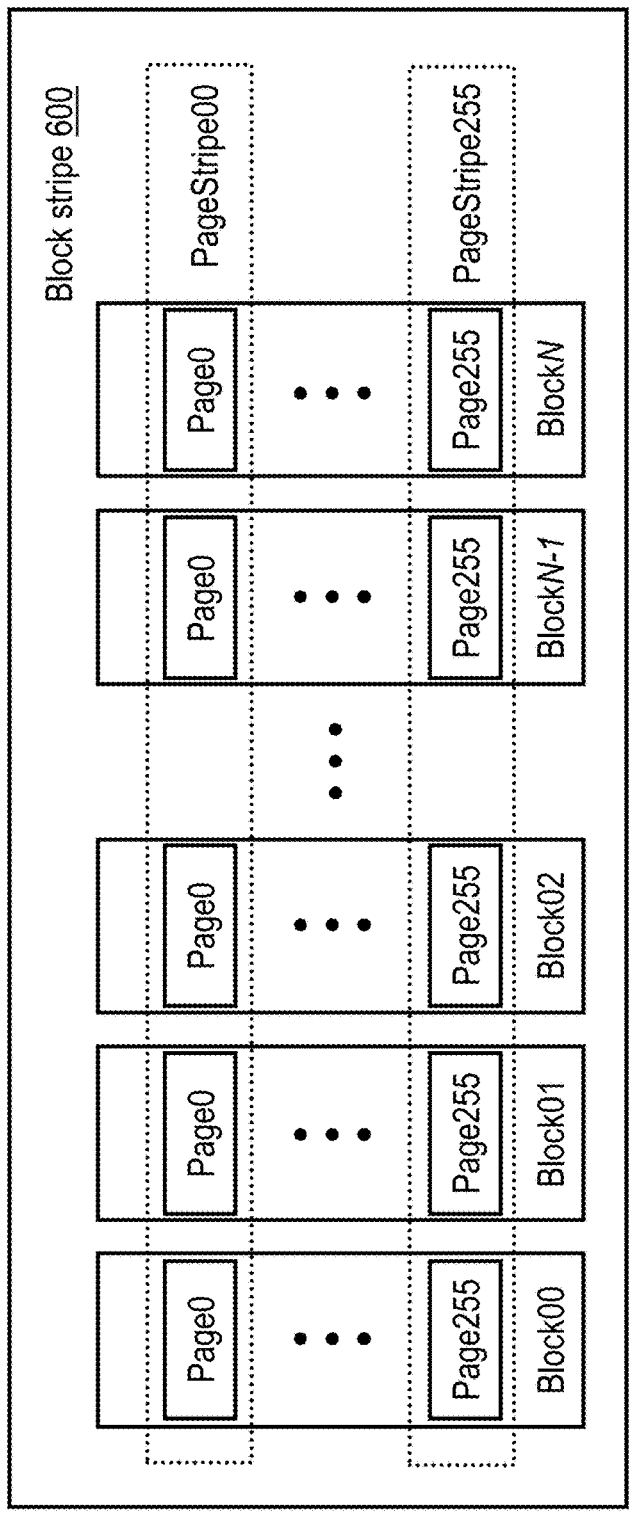
FIG. 6A depicts an exemplary implementation of a block stripe in accordance with the present disclosure.

In some embodiments, data is written to NAND flash memory system 150 one physical page at a time. In other embodiments in which more robust error recovery is desired, data is written to groups of associated physical pages of NAND flash memory system 150 referred to herein as "page stripes." In a disclosed embodiment, all pages of a page stripe are associated with different lanes to achieve high write bandwidth. Because in many implementations the smallest erase unit is a block, page stripes can be grouped into a block stripe as is shown in FIG. 6A, where each block in the block stripe is associated with a different lane. When a block stripe is built, any free block of a lane can be chosen, but preferably all blocks within the same block stripe have the same or similar health grade. Note that the block selection can be further restricted to be from the same plane, die, and/or chip enable. The lengths of the block stripes can and preferably do vary, but in one embodiment in which NAND flash memory system 150 includes 16 lanes, each block stripe includes between two and sixteen blocks, with each block coming from a different lane. Further details regarding the construction of block stripes of varying lengths can be found in U.S. Pat. Nos. 8,176,284; 8,176,360; 8,443,136; and 8,631,273, which are incorporated herein by reference in their entireties.

Figure 6B:
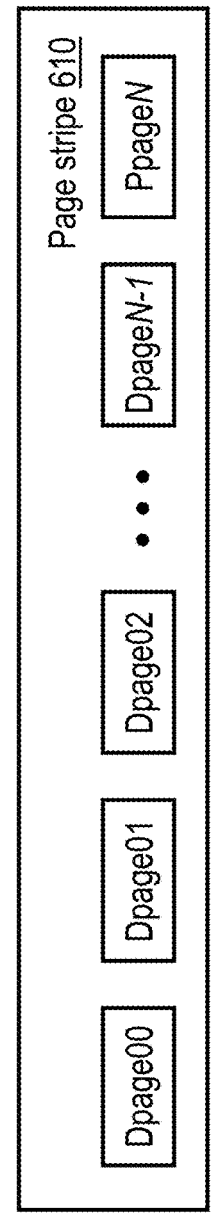
FIG. 6B depicts an exemplary implementation of a page stripe in accordance with the present disclosure.

Once a block from each lane has been selected and a block stripe is formed, page stripes are preferably formed from physical pages with the same page number from all blocks in the block stripe. While the lengths of the various page stripes stored into NAND flash memory system 150 can and preferably do vary, in one embodiment each page stripe includes one to fifteen data pages of write data (typically provided by a host device) and one additional page (a "data protection page") used to store data protection information for the write data. For example, FIG. 6B illustrates an exemplary page stripe 610 including N data pages (i.e., Dpage00 through DpageN−1) and one data protection page (i.e., PpageN). The data protection page can be placed on any lane of the page stripe containing a non-retired page, but typically is on the same lane for all page stripes of the same block stripe to minimize metadata information. The addition of a data protection page as illustrated requires that garbage collection be performed for all page stripes of the same block stripe at the same time. After garbage collection of the block stripe completes, the block stripe can be dissolved, and each block can be placed into the relevant ready-to-use (RTU) queue as explained below. Similarly to logical data pages that are being placed into page stripes of a block stripe, fingerprint MD pages may be placed there as well. Logical data pages and fingerprint MD pages may be intermingled. In fact, flash card 126 may actually not know the difference between regular logical data pages and fingerprint MD pages. The fingerprint MD pages may be stored on a dedicated meta-data volume controlled by the interface nodes 122 and not visible to the processor system 102. As the flash cards 126 have no notion of volumes, fingerprint MD page operations are handled as regular read and write operations.

FIG. 7 illustrates an exemplary format of a codeword stored in each data page within page stripe 610 of FIG. 6B. Typically, a positive integer number of codewords, for example, 2 or 3, are stored in each data page, but an alternative embodiment may also store a single codeword in a data page. In this example, each codeword 700 includes a data field 702, as well as additional fields for metadata describing the data page. Depending on the size of the codeword, the data field 702 holds data for one or more logical pages. In another embodiment it may also hold fractions of data of logical data pages. In the illustrated example, metadata fields include an LBA field 704 containing the LBAs stored in codeword 700, a CRC field 706 containing the CRC value computed for the combination of data field 702 and LBA field 704, and an ECC field 708 containing an ECC value calculated, in the illustrated example, from a combination of contents of data field 702, LBA field 704, and CRC field 706. In case data field 702 holds fractions of logical data pages, LBA field 704 further holds information on which fractions of logical data pages are stored in data field 702.

FIG. 8 depicts an exemplary format of a codeword in the data protection page of page stripe 610 of FIG. 6. In one embodiment, each data protection page stores a positive integer number of codewords, but an alternative embodiment a data protection page may store a single codeword. In the depicted example, data protection codeword 800 includes a data XOR field 802 that contains the bit-by-bit Exclusive OR (XOR) of the contents of the data fields 702 of the codewords 700 in page stripe 610. Data protection codeword 800 further includes an LBA XOR field 804 that contains the bit-by-bit XOR of LBA fields 704 of codewords 700 in page stripe 610. Data protection codeword 800 finally includes a CRC field 806 and ECC field 808 for respectively storing a CRC value and an ECC value for data protection codeword 800. Such a protection scheme is commonly referred to as RAID 5, since the parity field will not always be located on one particular flash plane. However, it should be appreciated that alternate data protection schemes such as Reed-Solomon can alternatively or additionally be used.

The formats for data pages and data protection pages described above protect data stored in a page stripe using multiple different data protection mechanisms. First, the use of the ECC bits in each data codeword of a data page allows the correction of some number of bit errors within the codeword in a flash page. Depending on the ECC method used it may be possible to correct hundreds of bits or even thousands of bits within a NAND flash page. After ECC checking and correction is performed, the corrected CRC field is used to validate the corrected data. Used together, these two mechanisms allow for the correction of relatively benign errors and the detection of more serious errors using only local intra-page information. Should an uncorrectable error occur in a data page, for example, due to failure of the physical page utilized to store the data page, the contents of the data field and LBA field of the failing data page may be reconstructed from the other data pages and the data protection page for the page stripe.

While the physical memory locations in which the data pages and data protection page of a page stripe will vary within NAND flash memory system 150, in one embodiment the data pages and data protection page that comprise a given page stripe are preferably stored in physical memory locations selected to optimize the overall operation of the data storage system 120. For example, in some embodiments, the data pages and data protection page comprising a page stripe are stored such that different physical lanes are employed to store each of the data pages and data protection page. Such embodiments support efficient access to a page stripe because flash controller 140 can access all of the pages of data that comprise the page stripe simultaneously or nearly simultaneously. It should be noted that the assignment of pages to lanes need not be sequential (i.e., data pages can be stored in any lane in any order), and unless a page stripe is a full length page stripe (e.g., containing fifteen data pages and one data protection page), the lanes utilized to store the page stripe need not be adjacent.

Having described the general physical structure and operation of one exemplary embodiment of a data storage system 120, certain operational aspects of data storage system 120 are now described with reference to FIG. 9, which is a high level flow diagram of the flash management functions and data structures employed by GPP 132 and/or flash controllers 140 in accordance with one embodiment.

As noted above, data storage system 120 does not generally allow external devices to directly address and/or access the physical memory locations within NAND flash memory systems 150. Instead, data storage system 120 is generally configured to present a single contiguous logical address space to the external devices, thus allowing host devices to read and write data to and from LBAs within the logical address space while permitting flash controllers 140 and GPP 132 to control where the data that is associated with the various LBAs actually resides in the physical memory locations comprising NAND flash memory systems 150. In this manner, performance and longevity of NAND flash memory systems 150 can be intelligently managed and optimized. In the illustrated embodiment, each flash controller 140 manages the logical-to-physical translation using a logical-to-physical translation data structure, such as logical-to-physical translation (LPT) table 900, which can be stored in the associated flash controller memory 142. As mentioned above, an LPT table, such as LPT table 900, can also be configured to store compressed page sizes of data pages stored in NAND flash memory systems 150 to aid in data deduplication.

Flash management code running on the GPP 132 tracks erased blocks of NAND flash memory system 150 that are ready to be used in ready-to-use (RTU) queues 906, which may be stored, for example, in GPP memory 134. In the depicted embodiment, management code running on the GPP 132 preferably maintains one or more RTU queues 906 per channel, and an identifier of each erased block that is to be reused is enqueued in one of RTU queues 906 corresponding to its channel. For example, in one embodiment, RTU queues 906 include, for each channel, a respective RTU queue 906 for each of a plurality of block health grades. In various implementations, between 2 and 8 RTU queues 906 per lane (and a corresponding number of block health grades) have been found to be sufficient.

A build block stripes function 920 performed by flash management code running on GPP 132 constructs new block stripes for storing data and associated parity information from the erased blocks enqueued in RTU queues 906. As noted above with reference to FIG. 6A, block stripes are preferably formed of blocks of the same or similar health (i.e., expected remaining useful life) residing in different channels, meaning that build block stripes function 920 can conveniently construct a block stripe by drawing each block of the new block stripe from corresponding RTU queues 906 of different channels. The new block stripe is then queued to flash controller 140 for data placement.

In response to a write IOP received from a host, such as a processor system 102, a data placement function 910 of flash controller 140 determines by reference to LPT table 900 whether the target LBA(s) indicated in the write request is/are currently mapped to physical memory page(s) in NAND flash memory system 150 and, if so, changes the status of each data page currently associated with a target LBA to indicate that it is no longer valid. In addition, data placement function 910 allocates a page stripe if necessary to store the write data of the write IOP and any non-updated data (i.e., in case the write request is smaller than a logical page, there is still valid data which needs to be handled in a read-modify-write manner) from an existing page stripe, if any, targeted by the write IOP, and/or stores the write data of the write IOP and any non-updated (i.e., still valid) data from an existing page stripe, if any, targeted by the write IOP to an already allocated page stripe which has free space left. The page stripe may be allocated from either a block stripe already allocated to hold data or from a new block stripe built by build block stripes function 920. In a preferred embodiment, the page stripe allocation can be based on the health of the blocks available for allocation and the "heat" (i.e., estimated or measured write access frequency) of the LBA of the write data. Data placement function 910 then writes the write data, associated metadata (e.g., CRC and ECC values), for each codeword in each page of the page stripe, and parity information for the page stripe in the allocated page stripe. The associated metadata and parity information can be written to storage as soon as enough host data has been placed into the page stripe. Flash controller 140 also updates LPT table 900 to associate the physical page(s) utilized to store the write data with the LBA(s) indicated by the host device. Thereafter, flash controller 140 can access the data to service host read IOPs by reference to LPT table 900 as further illustrated in FIG. 9.

Once all pages in a block stripe have been written, flash controller 140 places the block stripe into one of occupied block queues 902, which flash management code running on GPP 132 utilizes to facilitate garbage collection. As noted above, through the write process, pages are invalidated, and therefore portions of NAND flash memory system 150 become unused. An associated flash controller 140 (and/or GPP 132) eventually needs to reclaim this space through garbage collection performed by a garbage collector 912. Garbage collector 912 selects particular block stripes for garbage collection based on a number of factors including, for example, the health of the blocks within the block stripes and how much of the data within the erase blocks is invalid. In the illustrated example, garbage collection is performed on entire block stripes, and flash management code running on GPP 132 logs the block stripes ready to be recycled in a relocation queue 904, which can conveniently be implemented in the associated flash controller memory 142 or GPP memory 134.

The flash management functions performed by GPP 132 or flash controller 140 additionally include a relocation function 914 that relocates the still valid data held in block stripes enqueued in relocation queue 904. To relocate such data, relocation function 914 issues relocation write requests to data placement function 910 to request that the data of the old block stripe be written to a new block stripe in NAND flash memory system 150. In addition, relocation function 914 updates LPT table 900 to remove the current association between the logical and physical addresses of the data. Once all still valid data has been moved from the old block stripe, the old block stripe is passed to dissolve block stripes function 916, which decomposes the old block stripe into its constituent blocks, thus disassociating the blocks. Flash controller 140 then erases each of the blocks formerly forming the dissolved block stripe and increments an associated program/erase (P/E) cycle count for the block in P/E cycle counts 944. Based on the health metrics of each erased block, each erased block is either retired (i.e., no longer used to store user data) by a block retirement function 918 among the flash management functions executed on GPP 132, or alternatively, prepared for reuse by placing the block's identifier on an appropriate ready-to-use (RTU) queue 906 in associated GPP memory 134.

Figure 9:
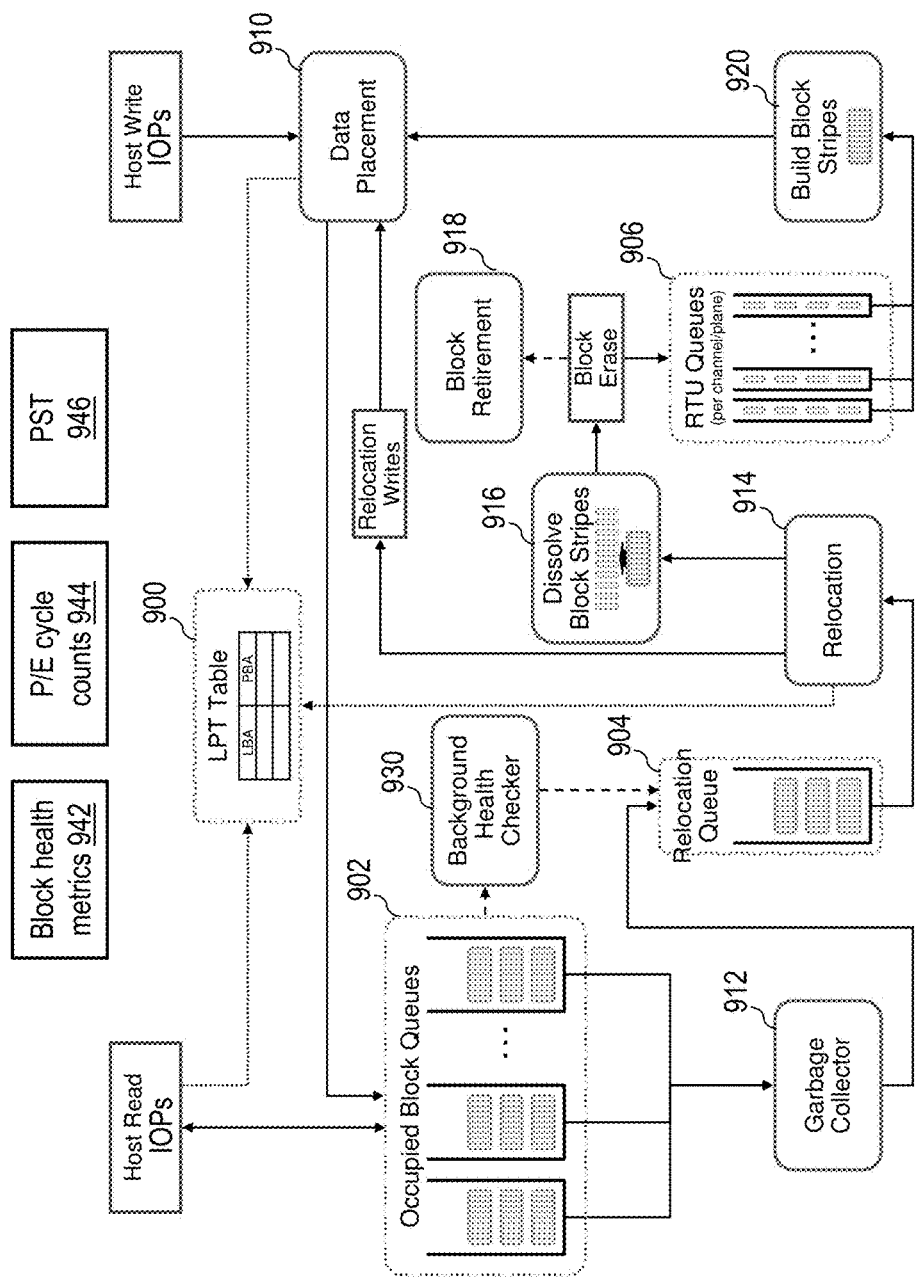
FIG. 9 is a high level flow diagram of the flash management functions and data structures employed by a flash controller in accordance with one embodiment.

As further shown in FIG. 9, flash management functions executed on GPP 132 include a background health checker 930. Background health checker 930, which operates independently of the demand read and write IOPs of hosts such as processor systems 102, continuously determines one or more block health metrics 942 for blocks belonging to block stripes recorded in occupied block queues 902. Based on the one or more of block health metrics 942, background health checker 930 may place block stripes on relocation queue 904 for handling by relocation function 914.

Figure 10:
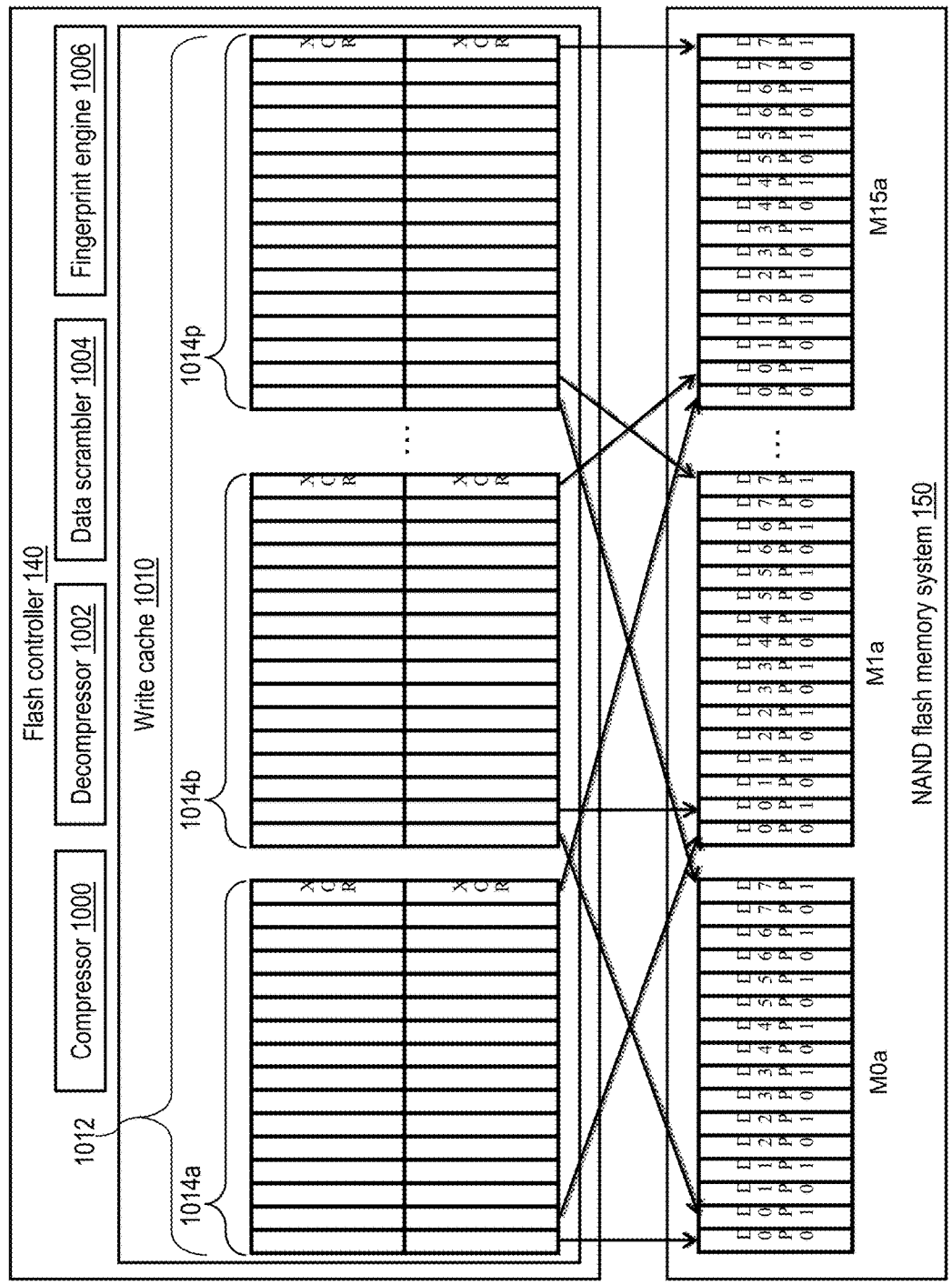
FIG. 10 depicts a more detailed view of an exemplary flash controller in accordance with one embodiment.

Referring now to FIG. 10, there is depicted a more detailed view of a flash controller 140 in accordance with one embodiment. In this embodiment, flash controller 140 is configured (e.g., in hardware, firmware, software or some combination thereof) to support retirement of memory in flash memory modules M0a, M0b, M1a, M1b, . . . , M1a, and M15b of a NAND flash memory system 150, for example, on a page-by-page basis rather than on a block-by-block basis, or a combination thereof. Flash controller 140 may be further configured to retire a physical page of memory while still keeping active other physical page(s) sharing a common set of multiple-bit memory cells with the retired physical page.

In the illustrated embodiment, flash controller 140 includes a compressor 1000 that selectively applies one or more data compression algorithms to data written to the associated NAND flash memory system 150, a decompressor 1002 that decompresses compressed data read from NAND flash memory system 150, and a data scrambler 1004. Flash controller 140 may also include an optional fingerprint engine 1006 similar to the fingerprint engine 118 in interface node 122. Flash controller 140 utilizes data scrambler 1004 to apply a predetermined data scrambling (i.e., randomization) pattern to data written to NAND flash memory 150 in order to improve endurance and mitigate cell-to-cell interference.

As further illustrated in FIG. 10, flash controller 140 includes a write cache 1010. Write cache 1010 includes storage for one or more cache lines 1012 for buffering write data in anticipation of writing the data to NAND flash memory system 150. In the illustrated embodiment, each cache line 1012 includes multiple (e.g., 16) segments 1014*a*-1014*p*, each providing storage for a respective page stripe of up to sixteen data pages (a maximum of fifteen data pages and one data protection page). As shown, for ease of implementation, it is preferred if flash controller 140 writes each page buffered in a given segment 1014 of cache line 1012 to the corresponding die index, plane index, and physical page index in each of sixteen flash memory modules. Thus, for example, flash controller 140 writes the data pages from segment 1014*a* to a first physical page (e.g., Page23) in each of flash memory modules M0*a*-M15*a*, writes the data pages from segment 1014*b* to a second physical page in each of flash memory modules M0*a*-M15*a*, and writes the data pages from segment 1014*p* to a sixteenth physical page in each of flash memory modules M0*a*-M15*a*.

As mentioned above, in one or more embodiments of the present disclosure, a received data page (e.g., candidate duplicate page) may be compressed to determine a compressed page size of the given candidate duplicate page. Compressed page sizes for data pages stored in the data storage system may then be retrieved (e.g., from an LPT table). The size of the candidate duplicate page may then be compared to compressed page sizes of the stored data pages to determine if the size of the candidate duplicate page is equal to one or more of the compressed page sizes of the stored data pages. If none of the size values are the same, the stored data pages cannot be the same as the candidate duplicate page.

If the size of the candidate duplicate page is the same as the size of one or more of the stored data pages, CRC values of the stored data pages may be read from flash page metadata (MD) or from a data page. The read CRC values may then be adjusted to remove header information contributions, as well as data contributions from other data pages store in the same codeword. The adjusted CRC values may then be compared to the CRC value of the candidate duplicate page and if none of the CRC values match the CRC of the candidate duplicate page, the candidate duplicate page cannot be a duplicate data page. In the event one or more stored data pages have the same CRC value as the candidate duplicate page, a fingerprint for the one or more stored data pages with matching CRC values may then be compared to a fingerprint for the candidate duplicate page.

The calculation of the fingerprint can be executed by fingerprint engine 118 and the comparison can be performed by control plane GPP 113, data plane processor 117, or data plane GPP 116. Alternatively, fingerprint calculation and comparison may also be delegated to flash controller 140 if a fingerprint engine 1006 is available in flash card 126. In the event a fingerprint for the candidate duplicate page is the same as a fingerprint for one of the stored data pages, a data storage system may replace the received data page with a reference to a corresponding data page included in the one or more data pages stored in the storage system, and the candidate duplicate data page may be discarded (as the candidate duplicate page is a duplicate data page). In the event a fingerprint for the candidate duplicate page is not the same as a fingerprint for one of the stored data pages, the candidate duplicate data page is stored in the storage system (as the candidate duplicate page is not a duplicate data page). Depending on the availability of page size and CRC value, the disclosed tests can be readily adapted by changing the order of the checks.

Figure 11:
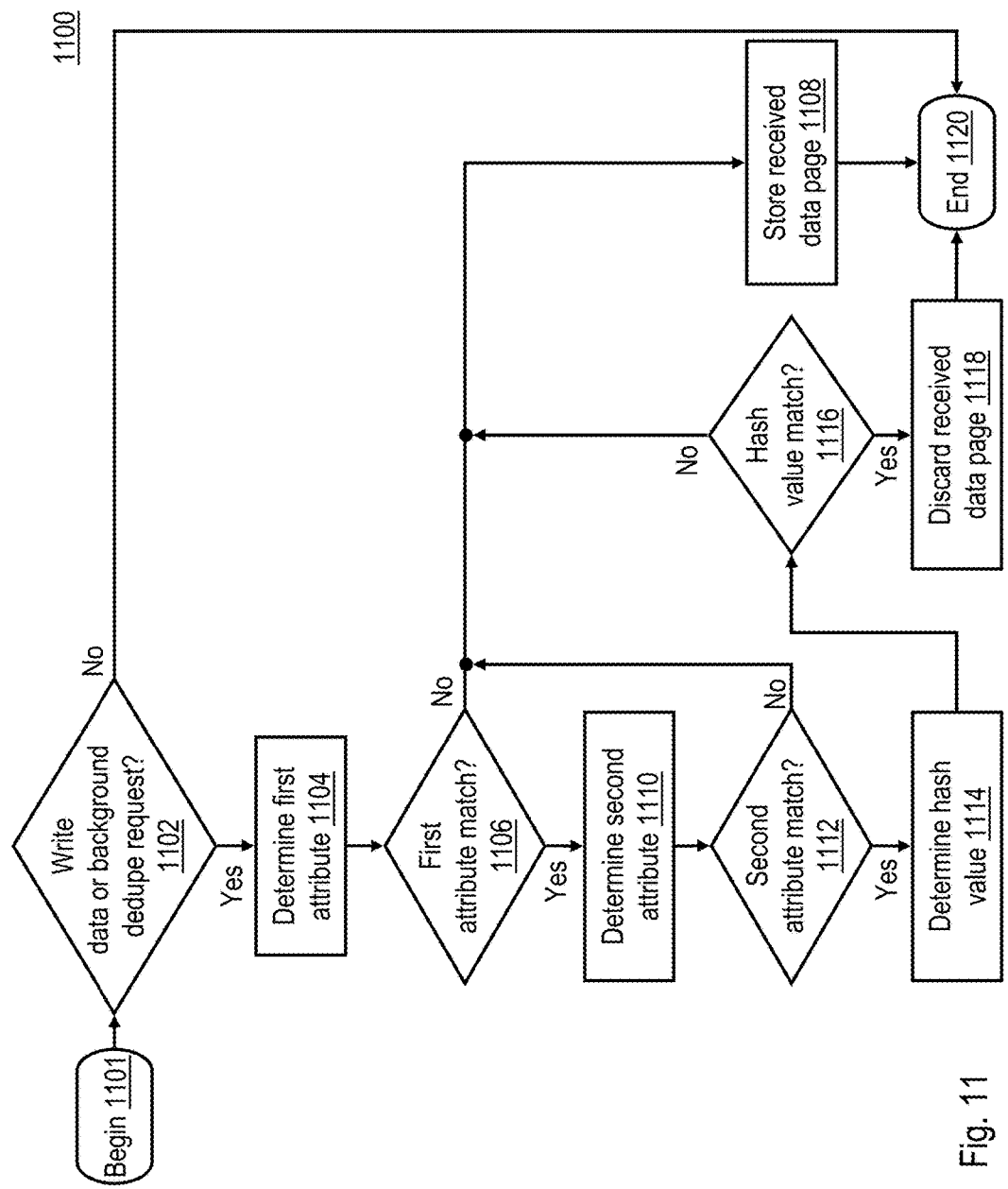
FIG. 11 is a high level logical flowchart of an exemplary process that performs data deduplication for a storage system in accordance with one embodiment of the present disclosure.

With reference to FIG. 11, an exemplary process 1100 is illustrated that performs data deduplication for a storage system in accordance with an embodiment of the present disclosure. In one or more embodiments, process 1100 is initiated, in block 1101, by interface node 122 when an IOP is received by interface card 111 of interface node 122. In another embodiment process 110 may also be initiated by a background deduplication request for a particular data page generated by management software in the interface node 122. Next, in decision block 1102, interface node 122 determines whether the IOP corresponds to a request to write a data page (i.e., a write IOP) to a flash card 126 or a background deduplication request for a particular data page. In response to the received IOP not corresponding to a write data page request or background deduplication request, control transfers from block 1102 to block 1120, where process 1100 terminates. In response to the received IOP corresponding to a write data page request or background deduplication request, control transfers to block 1104, where interface node 122 determines a first attribute (e.g., a compressed page size) of a received data page associated with the request. As one example, data plane processor 117 may be configured to compute the compressed page size of the received data page. Alternatively, calculation of the compressed page size may be delegated to flash cards 126. When the request is a background deduplication request, the compressed page size may be retrieved from LPT 900 of flash cards 126.

Next, in decision block 1106, control plane GPP 113 (or alternatively data plane processor 117 or even data plane GPP 116) determines whether the compressed page size of the received data page is the same as a compressed page size of one or more data pages stored in flash cards 126. As one example, control plane GPP 113 may access memory 114 or another memory to determine whether the compressed page size of the received data page is the same as a compressed page size of one or more data pages stored in data storage system 120. As another example, control plane GPP 113 may request that gateway 130 access LPT table 900 (e.g., maintained in flash controller memory 142 or another memory) to determine whether the compressed page size of the received data page is the same as a compressed page size of one or more data pages stored in flash cards 126. In yet another example, control plane GPP 113 may delegate the process of retrieving and comparing compressed page size of data pages to GPP 132 on flash cards 126. In response to the compressed page size of the received data page not being the same as a compressed page size of one or more data pages stored in data storage system 120 control transfers from block 1106 to block 1108. In block 1108 control plane GPP 113 requests that the received data page be stored in an appropriate flash card 126, as a duplicate data page is not already stored in data storage system 120 (given that no stored data page has the same compressed page size as the received data page). In response to the compressed page size of the received data page being the same as a compressed page size of one or more data pages stored in data storage system 120 control transfers from block 1106 to block 1110, as the received data page is still a candidate duplicate page.

In block 1110 gateway 112 determines a second attribute (e.g., a CRC value) for the received data page. As one example, data plane processor 117 may be configured to compute the CRC value of the received data page. This computation may also be delegated to flash card 126 in another example. Next, in decision block 1112, control plane GPP 113 (or alternatively data plane processor 117 or even data plane GPP 116) determines whether the CRC value of the received data page is the same as a CRC value of one or more data pages stored in data storage system 120. As one example, control plane GPP 113 may access a fingerprint lookup table (LUT) 115 maintained in memory 114 to determine whether the CRC value of the received data page is the same as a CRC value of one or more data pages stored in data storage system 120. As another example, control plane GPP 113 may request (via gateway 130) GPP 132 to determine whether the CRC value of the received data page is the same as a CRC value of one or more data pages stored in data storage system 120. GPP 132 may access a data page or a fingerprint MD page (e.g., maintained in NAND flash memory system 150 or another memory), LPT 900, or even reading the actual data page stored in NAND flash to re-compute the CRC using flash controller 140. In response to the CRC value of the received data page not being the same as a CRC value of one or more data pages stored in data storage system 120 control transfers from block 1112 to block 1108, where control plane GPP 113 requests that the received data page be stored in an appropriate flash card 126, as a duplicate data page is not already stored in data storage system 120 (given that no stored data page has the same CRC value as the received data page).

In response to the CRC value of the received data page being the same as a CRC value of one or more data pages stored in data storage system 120 control transfers from block 1112 to block 1114. In block 1114, control plane GPP 113 determines a fingerprint for the received data page. As one example, fingerprint engine 118 may be configured to compute the fingerprint of the received data page. Next, in decision block 1116, interface node 122 determines whether the fingerprint of the received data page is the same as a fingerprint of one or more data pages stored in data storage system 120. As one example, interface node 122 may access a fingerprint lookup table (LUT) 115 maintained in memory 114 to determine whether the fingerprint of the received data page is the same as a fingerprint of one or more data pages stored in data storage system 120. As another example, control plane GPP 113 may request that gateway 130 access one or more fingerprint MD pages (e.g., maintained in NAND flash memory system 150 or another memory) to determine whether the fingerprint of the received data page is the same as a fingerprint of one or more data pages stored in data storage system 120.

In response to the fingerprint of the received data page not being the same as a fingerprint of one or more data pages stored in data storage system 120 control transfers from block 1116 to block 1108, where control plane GPP 113 requests that the received data page be stored in an appropriate flash card 126, as a duplicate data page is not already stored in data storage system 120 (given that no stored data page has the same fingerprint as the received data page). In response to the fingerprint of the received data page being the same as a fingerprint of one or more data pages stored in data storage system 120 control transfers from block 1116 to block 1118, where control plane GPP 113 discards the received data page (given that the received data page is already stored in data storage system 120) and replaces the received data page with a reference to the corresponding data page already stored in the storage system. This reference information can be stored in memory 114 or on flash cards 126. Following block 1118 control transfers to block 1120.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As has been described, a controller of a non-volatile memory array retires physical pages within the non-volatile memory array on a page-by-page basis. The physical pages retired by the controller include a first physical page sharing a common set of memory cells with a second physical page. While the first physical page is retired, the controller retains the second physical page as an active physical page, writes dummy data to the first physical page, and writes data received from a host to the second physical page.

While the present invention has been particularly shown as described with reference to one or more preferred embodiments, it will be understood by those skilled in the art that various changes in form and detail may be made therein without departing from the spirit and scope of the invention. For example, although aspects have been described with respect to a data storage system including a flash controller that directs certain functions, it should be understood that present invention may alternatively be implemented as a program product including a storage device storing program code that can be processed by a processor to perform such functions or cause such functions to be performed. As employed herein, a "storage device" is specifically defined to include only statutory articles of manufacture and to exclude transmission media per se, transitory propagating signals per se, and forms of energy per se.

In addition, although embodiments have been described that include use of a NAND flash memory, it should be appreciated that embodiments of the present invention can also be used with other types of non-volatile random access memory (NVRAM) including, for example, phase-change memory (PCM) and combinations thereof.

The figures described above and the written description of specific structures and functions below are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a" is not intended as limiting of the number of items.

What is claimed is:
1. A method of data deduplication for a data storage system, comprising:
  comparing, by a controller, a first attribute of a received data page to one or more corresponding first attributes of one or more data pages stored in the storage system;

in response to the first attribute of the received data page not being the same as one or more of the first attributes, storing, by the controller, the received data page in the storage system;

in response to the first attribute being the same as one or more of the first attributes, comparing, by the controller, a second attribute of the received data page to one or more corresponding second attributes of the one or more data pages stored in the storage system;

in response to the second attribute of the received data page not being the same as one or more of the second attributes, storing, by the controller, the received data page in the storage system;

in response to the second attribute of the received data page being the same as one or more of the second attributes, comparing, by the controller, a fingerprint of the received data page to one or more fingerprints of the one or more data pages stored in the storage system, wherein generating the first and second attributes of the received data page is less computationally expensive than generating the fingerprint of the received data page;

in response to the fingerprint of the received data page not being the same as one or more of the fingerprints, storing, by the controller, the received data page in the storage system; and in response to the fingerprint of the received data page being the same as one or more of the fingerprints, replacing, by the controller, the received data page with a reference to a corresponding data page included in the one or more data pages stored in the storage system and discarding the received data page, wherein the first attribute corresponds to a cyclic redundancy check (CRC) value, the second attribute corresponds to a compressed page size, and the method further comprises: generating the CRC value for the received data page; and in response to the CRC value of the received data page being the same as a CRC value of one of the data pages stored in the storage system, compressing the received data page to generate the compressed page size.

2. The method of claim 1, further comprising:
generating the fingerprint for the received data page.

3. The method of claim 1, further comprising:
requesting, by an interface node of the storage system, scanning on a flash card of the storage system for one or more compressed page sizes stored in a table that associates compressed page sizes with logical addresses of stored data pages; and
receiving, by the interface node, a result of the scanning from the flash card.

4. The method of claim 1, further comprising:
requesting, by an interface node of the storage system, scanning on a flash card of the storage system for one or more cyclic redundancy check (CRC) values; and
receiving, by the interface node, a result of the scanning from the flash card, wherein the CRC values are stored in a NAND flash memory system of the flash card.

5. The method of claim 4, further comprising:
adjusting the CRC values to remove information not related to a logical data page.

6. The method of claim 1, wherein the received data page is read from a flash card by a background deduplication process.

7. A data storage system, comprising:
an interface node coupled to one or more data storage devices of the data storage system, wherein the interface node is configured to:
compare a first attribute of a received data page to one or more corresponding first attributes of one or more data pages stored in the storage system;
in response to the first attribute of the received data page not being the same as one or more of the first attributes, store the received data page in the storage system;
in response to the first attribute being the same as one or more of the first attributes, compare a second attribute of the received data page to one or more corresponding second attributes of the one or more data pages stored in the storage system;
in response to the second attribute of the received data page not being the same as one or more of the second attributes, store the received data page in the storage system;
in response to the second attribute of the received data page being the same as one or more of the second attributes, compare a fingerprint of the received data page to one or more fingerprints of the one or more data pages stored in the storage system, wherein generating the first and second attributes of the received data page is less computationally expensive than generating the fingerprint of the received data page;
in response to the fingerprint of the received data page not being the same as one or more of the fingerprints, store the received data page in the storage system; and
in response to the fingerprint of the received data page being the same as one or more of the fingerprints, replace the received data page with a reference to a corresponding data page included in the one or more data pages stored in the storage system and discard the received data page, wherein the first attribute corresponds to a cyclic redundancy check (CRC) value, the second attribute corresponds to a compressed page size, and the interface node is further configured to: generate the CRC value for the received data page; and in response to the CRC value of the received data page being the same as a CRC value of one of the data pages stored in the storage system, compress the received data page to generate the compressed page size.

8. The data storage system of claim 7, and the interface node is further configured to:
generate the fingerprint for the received data page.

9. The data storage system of claim 7, wherein the interface node is further configured to:
request scanning on a flash card of the storage system for one or more compressed page sizes stored in a table that associates compressed page sizes with logical addresses of stored data pages; and
receive a result of the scanning from the flash card.

10. The data storage system of claim 7, wherein the interface node is further configured to:
request scanning on a flash card of the storage system for one or more cyclic redundancy check (CRC) values; and
receive a result of the scanning from the flash card, wherein the CRC values are stored in a NAND flash memory system of the flash card.

11. A computer program product, the computer program product comprising a computer readable storage medium having program instructions embodied therewith, the program instructions executable by a controller, to cause the controller to:

compare a first attribute of a received data page to one or more corresponding first attributes of one or more data pages;

in response to the first attribute of the received data page not being the same as one or more of the first attributes, store the received data page;

in response to the first attribute being the same as one or more of the first attributes, compare a second attribute of the received data page to one or more corresponding second attributes of the one or more data pages stored in the storage system;

in response to the second attribute of the received data page not being the same as one or more of the second attributes, store the received data page in the storage system;

in response to the second attribute of the received data page being the same as one or more of the second attributes, compare a fingerprint of the received data page to one or more fingerprints of the one or more data pages stored in the storage system, wherein generating the first and second attributes of the received data page is less computationally expensive than generating the fingerprint of the received data page;

in response to the fingerprint of the received data page not being the same as one or more of the fingerprints, store the received data page; and in response to the fingerprint of the received data page being the same as one or more of the fingerprints, replace the received data page with a reference to a corresponding data page included in the one or more data pages and discard the received data page, wherein the first attribute corresponds to a cyclic redundancy check (CRC) value, the second attribute corresponds to a compressed page size, and the program instructions further cause the controller to: generate the CRC value for the received data page; and in response to the CRC value of the received data page being the same as a CRC value of one of the data pages stored in the storage system, compress the received data page to generate the compressed page size.

12. The program product of claim 11, wherein the program instructions further cause the controller to:
generate the fingerprint for the received data page.

13. The program product of claim 11, wherein the program instructions further cause the controller to:
request scanning on a flash card of the storage system for one or more compressed page sizes stored in a table that associates compressed page sizes with logical addresses of stored data pages; and
receive a result of the scanning from the flash card.

14. The program product of claim 11, wherein the program instructions further cause the controller to:
request scanning on a flash card of the storage system for one or more cyclic redundancy check (CRC) values; and
receive a result of the scanning from the flash card, wherein the CRC values are stored in a NAND flash memory system of the flash card.

* * * * *